*Gillet-Damitte, Dubois & Boissonneau.*
*Paper Products.*
Nº 86,917. Patented Feb. 16, 1869.
Galega Officinalis.
Witnesses: Inventors:

United States Patent Office.

JEAN JACQUES GILLET-DAMITTE, HECTOR DENIS DUBOIS, AND AUGUSTE BOISSONNEAU, OF PARIS, FRANCE.

Letters Patent No. 86,917, dated February 16, 1869.

IMPROVED MATERIAL FOR THE MANUFACTURE OF PAPER.

The Schedule referred to in these Letters Patent and making part of the same.

*To all whom it may concern:*

Be it known that we, JEAN JACQUES GILLET-DAMITTE, of No. 36 rue de Reuilly, editor to the Moniteur, HECTOR DENIS DUBOIS, of No. 21 Boulevart de Capucines, artificial-flower manufacturer, and AUGUSTE BOISSONNEAU, of No. 7 rue de Monceaux, artificial-eye manufacturer, have conjointly invented certain Improvements in the Manufacture of Paper, having discovered that paper of good quality can be manufactured from a plant called galega, of which there are several kinds, among others, those known by botanists under the names of *Galega officinales* and *Galega orientalis*.

Now, our invention consists in employing, as manufacturing-material, either kind known of the said plants, which can be easily cultivated in every country.

For making paper-pulp, the said plants are submitted nearly to the same process of trituration, and in the same manner as rags or any other raw material used for the same purpose, to be afterward transformed into sheets.

Either variety of the galega may be used alone, or the several kinds may be mixed together in various proportions, or either of them be mixed with other textile plants or substances commonly used for manufacturing paper, and also in various proportions, according to the kind of paper to be produced.

A fair trial was made by us in manufacturing paper with galega, and the result was very favorable.

Annexed to this, our specification, and forming part of the same, is a colored drawing, showing part of a stalk of galega in blossom, ready for reaping.

We claim as our invention, and desire to secure by Letters Patent of the United States—

As a new article of manufacture, a pulp suitable for the manufacture of paper, produced from the plants known as galega, whether used alone or in combination with other fibrous substances, in the manufacture of paper, substantially as above described.

J. J. GILLET-DAMITTE.
H. D. DUBOIS.
A. BOISSONNEAU.

Witnesses:
F. OLCOTT,
D'AUBRÉVILLE.